United States Patent [19]
Curtis et al.

[11] Patent Number: 5,943,145
[45] Date of Patent: *Aug. 24, 1999

[54] PHASE DISTANCE MULTIPLEX HOLOGRAPHY

[75] Inventors: Kevin Curtis, Summit; William Larry Wilson, Somerville, both of N.J.

[73] Assignee: Lucent Technologies Inc., Murray Hill, N.J.

[ * ] Notice: This patent is subject to a terminal disclaimer.

[21] Appl. No.: 08/435,681

[22] Filed: May 5, 1995

[51] Int. Cl.[6] .............................. G03H 1/26; G03H 1/12; G03H 1/20
[52] U.S. Cl. ................................ 359/22; 359/11; 359/12; 359/24; 365/125; 369/103
[58] Field of Search .................................. 359/10, 11, 22, 359/24; 365/125, 216, 234; 369/103

[56] References Cited

U.S. PATENT DOCUMENTS

| | | | |
|---|---|---|---|
| 4,420,829 | 12/1983 | Carlson | 369/103 |
| 5,007,690 | 4/1991 | Chern et al. | 359/11 |
| 5,046,792 | 9/1991 | Zabka | 359/26 |

OTHER PUBLICATIONS

*Applied Optics*, vol. 7, No. 1, pp. 91–94 (1968).
*Opt. Spectrosc.* (USSR), vol. 47, No. 5, pp. 530–535 (1979).
1995 OSA Conf. on Optical Computing, *OSA Technical Digest Series*, vol. 10, pp. 219–221.
*Sov. J.Quantum Electron.* vol. 7, No. 8, pp. 961–964 (1977).
*Optoelectronics,* vol. 8, No. 1, pp. 21–34 (1993).
*Optoelectronics,* vol. 8, No. 1, pp. 111–123 (1993).
*Appl. Phys. Lett.,* vol. 63, No. 13, pp. 1727–1729 (1993).
*Optical Holography,* Academic Press, Inc., San Diego, CA, chap. 10, pp. 265–310 (1971).
*Handbook of Optical Holography,* Academic Press, Inc., pp. 373–377 (1979).
*Optics Letters,* vol. 17, No. 9, pp. 676–678 (1992).
*Holography Handbook,* Ross Books, Berkekey, CA, pp. 56,57 (1993).
*CD–ROM Librarian,* vol. 7, No. 4, pp. 16–21 (1992).
M.I. Jones et al., "Multiplex Holography for Space–Variant Optical Computing", SPIE vol. 177 Optical Information Storage (1979).

*Primary Examiner*—Paul M. Dzierzynski
*Assistant Examiner*—Darren E. Schuberg
*Attorney, Agent, or Firm*—George S. Indig

[57] ABSTRACT

Selection of individual holograms during read-out of a multiplexed array depends upon varying relative position of the recording medium in the direction orthogonal to the medium surface.

21 Claims, 2 Drawing Sheets

PHASE DISTANCE MULTIPLEX HOLOGRAPHY

TECHNICAL FIELD

Holography.

DESCRIPTION OF RELATED ART

Holography, by which images are reconstructed from patterns produced by interference between a signal and reference beam has, from its inception in 1948, provoked interest in artistic circles. Its very large storage capacity soon led to contemplated use for digital storage. Both were given impetus by the introduction of the laser, which would serve as a stable, high-intensity, monochromatic light source.

Desire to take advantage of high density storage soon led to multiplexing. An early process, "spatial multiplexing", simply records successive images in independent regions of the recording medium. Packing density is limited by the need to keep holograms separated.

A number of processes record successive holograms in the same region of the medium. In "angle multiplexing", differentiation depends on angle of incidence of the readout beam. In "wavelength multiplexing", coincident or overlapping images are independently accessed by changing wavelength. A method described in APPLIED OPTICS vol. 7, no. 1, p. 91 (1968), bases multiplexing and readout of sequential holograms on phase information imposed on the reference and readout beams by successive ground glass masks.

Selectivity in angle multiplexing, wavelength multiplexing, and phase code multiplexing, all dependent on Bragg selectivity, is enhanced with "Volume holography", using a thick recording medium. A. P. Yakimovich, in Opt Spectrosc. (USSR) vol. 47, no. 5, November 1979, at pp. 530–535, describes use of a spherical reference beam, in lieu of the usual plane wave. Implications in differentiating overlapping images are clear. He also presents a model for z-direction selectivity using a spherical reference beam and a thick medium. Using his model, it has been found possible to multiplex a few holograms by changing the distance between the medium and the reference focal point.

Differentiation between successive overlapping holograms at different positions on a shifted medium depend on Bragg selectivity. The method, "shift holography", has been described by A. Pu, et al. See, 1995 OSA Conference on Optical Computing, OSA Technical Digest Series, vol. 10, pp. 219–221. It provides for high density packing of successive holograms in an x-y array. Overlapping holograms produced by shifting the medium in the "x-direction"—in the grating direction—are differentiated by first-order Bragg selectivity. By slanting the plane of the grating so that it is oblique to the medium, second order Bragg selectivity permits selection of holograms overlapping in the y-direction. Reported densities are excellent, but required a thick (8 mm) recording medium.

Advances in the recording medium have not kept pace. Results reported by Pu, et al. used a free-standing crystal. Cost and manufacture expedience would profit by substitution of a deposited layer. To date, acceptable layered media have had a maximum thickness of only one hundred or a few hundred $\mu$m. It will be some time before layered media of the desired 8 mm thickness are available.

Co-filed Application

Co-filed U.S. patent application Ser. No. 08/435,705 describes and claims "phase-correlation multiplex holography" in which phase selectivity serves to differentiate overlapping holograms in an array. In a preferred embodiment a phase mask in the reading beam, identical in form and position to that used in recording, reconstructs the selected hologram. The process does not rely on Bragg selectivity, is truly two dimensional, and does not require a thick medium.

SUMMARY OF THE INVENTION

In "phase-distance holography", as in the "phase-correlation holography" of the co-filed application, phase selectivity replaces Bragg selectivity as the means for differentiating overlapping images, and permits use of thin recording media. Differentiation depends on identity of phase and attendant diffraction characteristics for the reference beams used in recording reconstruction. In the preferred embodiment, a single random phase mask in the path of the reference beam introduces the phase content that is used for selection of individual holograms of an overlapping series.

It is now observed that, unlike multiplexing based on Bragg selection, there is significant selectivity in the "z-direction"—in the direction orthogonal to the plane of the hologram. This selectivity serves for multiplexing by varying the distance between the phase mask and the medium. Variants use the process by itself, or in conjunction with phase-correlation multiplexing or with spatial multiplexing.

Early experiments show sufficient selectivity for multiplexing 10 to 100 holograms or more—justification for a stand-alone process.

TERMINOLOGY

Figure 1:
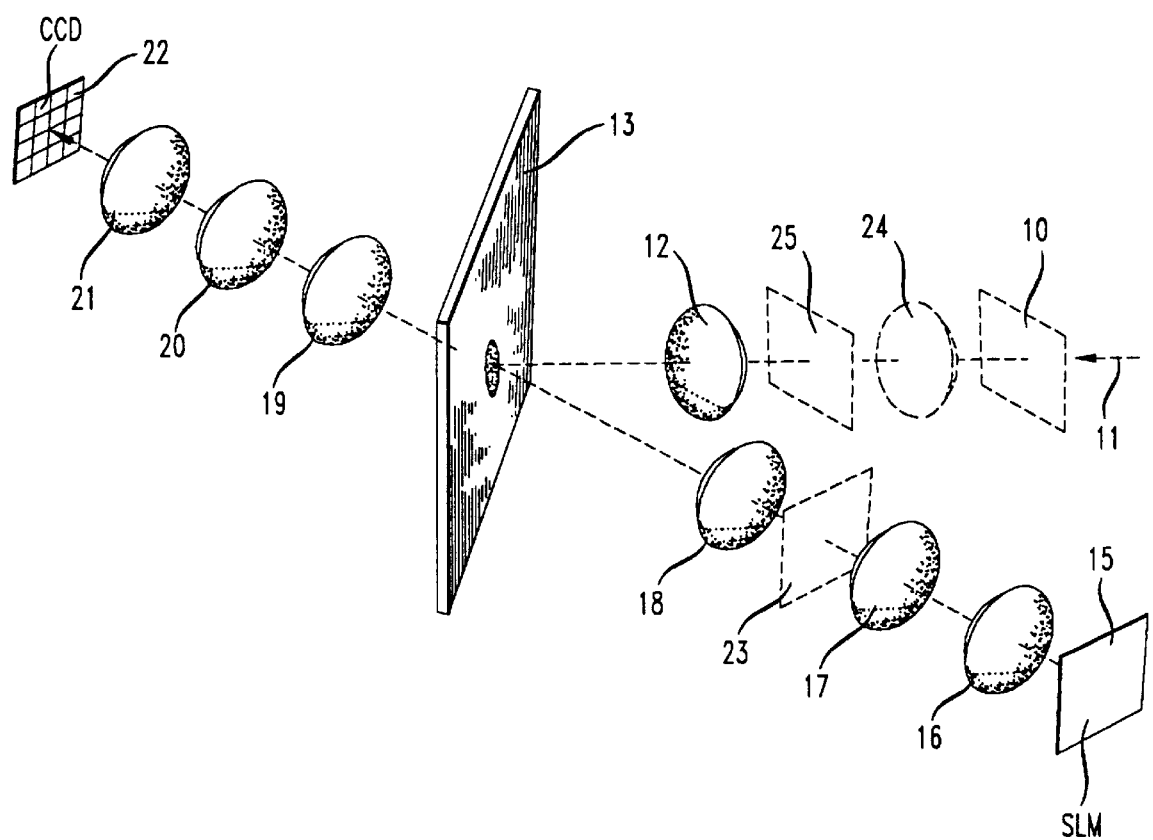
FIG. 1 is a schematic representation of the apparatus used in the Examples.

Disclosure is facilitated by use of a terminology convention. Certain terms are adopted from shift holography (in which first order Bragg selectivity is required for differentiating overlapping holograms in the shift direction). While useful for description and comparison, these terms do not imply the limitations of the earlier process. As a prime example, since Bragg selectivity is not used, there is no relationship between direction and packing density.

X-Direction—The direction of relative motion between the recording medium and the beams in the plane of the recording medium.

Y-Direction—The major direction orthogonal to the x-direction in the recording medium.

Z-Direction—The direction orthogonal to the plane of the recording medium.

Auto-Correlation Function—The similarity function indicating traversal distance necessary for meaningful change in the amount of overlap of the concerned function. See, Sov. J. Quant. Electron., vol. 7, no. 8, pp. 961–964, August 1977, describing the function as applied to a phase mask.

Phase Beam—Characterizing the reference beam as incident on the holographic medium, constituting a beam containing many rays of varying angles of incidence and of non-uniform phase content to result in an auto-correlation function adequate for needed selectivity. The term is intended to include beams of deterministic ray and phase content.

Phase-Ordered Beam—Differentiated from a phase beam, a beam primarily consisting of a single ray or of rays of continuously varying angle, e.g., a plane wave, or a converging or diverging beam. Its auto-correlation function is substantially equal to its cross-sectional area. A phase-ordered beam is not suitable for the invention.

Phase Mask—Mask which, as illuminated by a phase-ordered beam, yields a phase beam. The term includes conventional phase plates and/or scatter plates containing a prescribed ordered array of random or deterministic pixels of constant or varying phase delay. The term includes ground glass which is exemplary of masks containing a random array, which while functional, may hinder some contemplated uses.

Holographic Medium (or "Medium")—The actinic material within which the hologram is recorded. It may take a variety of forms, such as, e.g., a film containing dispersed silver halide particles, an acrylate-based photopolymer, or a free-standing $LiNbO_3$ crystal.

Random—Non-prescribed order, defining a sequence which does not repeat over a substantial fraction of the field. The term is descriptive of pixels within a phase mask or of rays within a beam.

Overlapping—Refers to holograms with at least regions of differing holograms occupying the same volume of the medium. The term is intended to include the usual consequence of in-plane multiplexing in which the overlapping holograms are not restricted to the identical volume, as well as a contemplated variant of distance multiplexing in which overlapping holograms, as recorded, are restricted to the identical volume.

Thin Medium—Recording medium of less than 1 mm—as distinguished from "thick media" $\geq 1$ mm. (The designation is a formal one based primarily on available product. It does not have the significance of media used for multiplexing based on Bragg selection.)

DETAILED DESCRIPTION

General—Phase distance holography functions as a truly two-dimensional holographic multiplexing process. Preferred embodiments use a medium which is sufficiently thin to preclude Bragg selectivity for differentiation of successive holograms. It shares the attributes of phase-correlation multiplex holography, and offers extremely high storage densities.

Selection is now entirely based on the content of the reference beam—on inclusion of rays of differing angle of incidence and of non-uniform phase. Adequacy is measurable in terms of the auto-correlation function of the phase mask or of the corresponding function for the beam. A first consequence for phase correlation holography is to make selection independent of direction in the plane of the medium—selectivity in y- and x-directions, or in intermediate directions, can be made identical in the absence of limitations imposed by the medium or by processing conditions.

Promising results in conventional shift holography have depended on use of thick media—thicknesses of 8 mm and greater. Widespread use requires development of a thick organic photopolymer layer to replace the expensive, free-standing lithium niobate crystal. That impediment is now avoided. The two Examples, Example 2 using an $LiNbO_3$ crystal, and Example 3 using a 20 µm polymer film, in showing full equivalence in selectivity, are verification. Commercial implementation of phase correlation holography is expected to use media thickness of <1 mm.

Two-dimensional (2D) multiplexing with thin media relaxes processing constraints. Angles of incidence for signal and reference beams—"half-angles" (for each of the beams and a line orthogonal to the medium)—need not be equal. Distance multiplexing is facilitated by following a practice established in companion application Ser. No. 08/435,705 in which the reference beam is orthogonal to the surface of the medium.

Selectivity in the z-direction has been at least an order of magnitude poorer, requiring z-direction shifting at least 10 times greater than for x or y, although improved selectivity is expected. Significant deviation from orthogonality results in an x- or y-component of the order of that required for x-shifting. For contemplated compound processes, multiplexing in 3D, the complication of accounting for this is avoided with an orthogonal reference beam.

Other criteria of phase-correlation holography, particularly where thin media are used, are equally applicable—procedures are more forgiving than for Bragg-selection multiplexing. Optics for imaging the phase mask on the medium, preferred for thick media, are of little consequence for thin media. Spatial filtering, in the Fourier plane of the reference lens, is not required for thin media, although some further improvement in signal-to-noise ratio (SNR) may result.

The System—General discussion is aided by reference to FIG. 1. Elements shown in phantom indicate alternatives and enable discussion of system variations. Both versions of FIG. 1 use an illuminating beam 11, which is converted into a phase beam by a phase mask. In the instance of the Examples, the mask was imaged on the medium by use of both lenses 12 and 24, with the phase mask positioned on plane 10. The phase mask used was a random binary phase mask and had a pixel pitch of 20 µm, was of approximate overall dimensions, 2 cm×2 cm (1024×1024 pixels). Half of the randomly located pixels imposed a phase-shift of 180°, so that changing phase across the beam front averaged at zero. The signal beam is modulated by "spatial light modulator" 15 producing a signal pattern from a computer not shown. Medium 13 was a 4 mm thick layer of $LiNbO_3$ in Examples 1, 2 and 4, and was replaced by a thin medium in Example 3.

The experimental arrangement shown provides for signal introduction through lenses 16, 17 and 18, and for readout by means of lenses 19, 20 and 21. With lenses in standard 4F configuration, a Fourier transform is recorded on medium 13, and is reconstructed to produce an image on detector 22. 4F configuration requires focal distance spacings so that object-to-lens 16 spacing is equal to the focal distance of lens 16, $F_{16}$, lens 21-to-detector spacing is equal to the focal distance $F_{21}$, and lens to lens spacings are the sum of focal distances, i.e., $F_{16}+F_{17}$ for the distance between lenses 16 and 17.

The specifics of the arrangement are only illustrative. 4F optics are not required—relay optics are acceptable. Spatial filtering may be done between lenses, in the lens series 19–21, to improve SNR. The phase mask need not be located at either the focal plane nor the focus of lens 12, nor is it required that medium 13 be located at the other focal plane. Lens 24, shown in phantom, illustrates the arrangement providing for imaging the mask, located at plane 10, onto the medium. Without a lens at plane 10, and with the phase mask at plane 25, the Fourier transform of the phase mask replaces the image. It is not required that beam 11 be a plane wave—e.g., a spherical beam has been substituted. Selectivity is not very sensitive to the exact position of the phase mask, but it is required that the position be the same during reconstruction. Omission of lenses in the reference beam results in some loss in selectivity which may be tolerable.

The apparatus shown is otherwise illustrative only. Arrangement for Fourier transform holography storage is only one option. For example, with successive elements still located on Fourier planes, omission of one lens in each of the 16–18 and 19–21 lens series results in an image hologram and continues to provide for image reconstruction. The observation that recording may be intermediate Fourier and images planes is valuable for distance multiplexing since, under many conditions, refocusing is not required. A phase mask in contact with SLM 15 or at image plane 23 assures uniform brightness of the signal beam for better recording. In addition, the signal beam may be filtered to eliminate higher-order diffraction modes.

For thick media—for media >1 mm—best results have been obtained for imaging of the phase mask on the recording medium. For thick media, it has been found useful to filter out zeroth order diffracted waves by use of a blocking filter on Fourier plane 25 in the reference beam. Such a DC filter, consisting of a central blocking region, may in addition have horizontal and vertical lines crossing at this region, so as to additionally block x- and y-components.

For thin media, the Fourier plane filter may not be necessary. With the 20 $\mu$m thick medium of Example 2, noise was small without it. While a Fourier transform of the phase mask is as effective as an image, use of a spatial filter with a transform, rather than an image, may result in some increase in SNR. Filtering is desirably on the plane of the phase mask.

Distance multiplexing requires relative motion of material 13 and the reference beam. It is convenient to describe this motion in terms of movement of the material along the direction of the preferred orthogonal beam. Selectivity is based on phase and diffraction content of the beam as incident on the material, and this is easily accomplished by movement of the phase mask or the material. There is no requirement for maintaining the phase relationship of the signal and reference beams, so that the SLM may be kept stationary while moving the mask. Thus far, there has been no need for moving the detector (CCD 22).

For stand-alone operation, only z-direction shifting is required. For compound, z, x, y multiplexing, provision is also made for the in-plane movement of the companion application.

Phase Beam—In the generally discussed embodiment, the phase mask is illuminated by a phase-ordered beam such as a plane wave, and only thereafter is a reference beam with proper phase and angle content produced. More generally, the requirement for the reference beam is that it contain the proper phase information and angle content when interfering with the signal beam—produced either at inception, or by modulation of a phase mask, or by a combination of the two.

The phase mask may be dispensed with altogether. Phase locked diode arrays have been proposed for use in holographic neural networks. See *Optoelectronics*, vol. 8, no. 1, pp. 21–34 March 1993. The same form of circuitry may be used to form a phase-mismatched diode array on an integrated circuit, and serve to generate the beam. Other forms of multiple point-source arrays are visualized. A series of properly directed lenslets *Optoelectronic*, vol. 8, no. 1, pp. 111–123 (March 1993), or reflecting surfaces may introduce phase content in lieu of (or as a form of) phase mask.

Phase Mask—Characteristics relevant to in-plane phase correlation multiplexing are well known. The term includes both ground glass with its very large number of small dissimilar pixels, and binary phase masks with a smaller number of nominally identical pixels, as well as intermediate phase mask structures. In all events, traversal time for radiation varies across the exit surface of the mask, to produce the changing phase delay which is the essence of the mask. For a very high level of perfection, a binary phase mask containing 20 pixels, each $\frac{1}{20}$th of the mask area is sufficient for the invention. Expected imperfections are accommodated by a 10 pixel×10 pixel mask, and such a mask is regarded as a minimum requirement for the invention.

For the nominal phase mask in which 50% of the surface is altered from planarity, etch pits introducing a phase change of at least 15° is operative, although a phase change of at least 45° is preferred. For minimizing noise, the average phase variation for the entire mask should be close to zero, in turn requiring a phase change of 180° in the instance of the binary phase mask. This is achieved in a conventional binary mask in which etch pits occupy 50% of the mask surface. The requirement is statistically satisfied in the most complex phase mask—in ground glass—in which widely varying pixels, most varying one from another by many wavelengths, occupy the entire surface.

The functioning characteristic of the phase mask is defined in terms of its auto-correlation function. In inexact terms, this is a measure of the position-to-position self-similarity of the mask. The requirement, that the mask have the desired selectivity, may be measured in terms of the auto-correlation peak width—with the peak width approximately equal to the needed selectivity. This assumed correspondence is descriptive of high-quality, commercially-available phase masks. (Accordingly, one suitable commercial phase mask is a random phase mask specified by: a) wavelength; b) number of pixels; and c) pixel pitch.)

Experimentally, sufficient phase content has been introduced into a plane wave beam with a random mask constituted of pixels of a pitch (size) of 10–20 $\mu$m, with at least 100 pixels in each of the x- and y-directions in the mask. In theory not required, maximal varied pixel delay times approaching 180° lessen effects of compositional and physical non-uniformities, and relax manufacturing specifications. A number of practical considerations at this time set a limit on achievable density. Factors, such as the dynamic range of the medium and the mechanics of shifting limit usable density, and, accordingly, shift distance. Ultimate packing density where distance multiplexing is not used as a stand-alone process, but is combined with in-plane multiplexing in accordance with the companion application, depends on similar factors as described in detail in that application.

Alternative to the usual commercial random binary phase mask in which identical etch pits are randomly positioned, differing pixel-associated delay times may be associated with an ordered pixel array. Various techniques offered randomness both in position and in individual pixel characteristics (such as in ordinary ground glass). An averaged mask delay time of zero statistically assures cancellation of overlapping hologram regions and lessens noise.

All of the same considerations apply for z-multiplexing, with the reservation that attained packing densities have thus far been at least an order of magnitude less than for in-plane multiplexing. As a consequence, in stand-alone processing, there may be some relaxation in mask requirements. On the expectation that medium resolution will not be limiting for z-multiplexing alone, so that it will be used together with in-plane multiplexing, mask considerations are unchanged.

There may be economic or other circumstances in which it is desirable to use an ordered phase mask to yield a deliberately repeating sequence over a relatively small fraction of the field. This consideration may outweigh the usual objective of absolute independence of multiplexed holograms, so that some additional noise may be tolerated. In the same fashion, a deterministic phase mask—a mask with prescribed pixel-to-pixel order, may be used e.g., to maximize diffraction efficiency of the hologram or optical throughput of the system.

Foreseen uses require replication of phase masks. A variety of procedures may be suitable. Individual masks may be produced from a master mask with techniques used in fabrication of semiconductor integrated circuits. Surface-modified masks may be replicated by stamping, embossing, or casting. These procedures are now used for replication of gratings or other diffractive optics. A procedure used in the "writing" of glass fiber gratings, may be used in lieu of material removal—the procedure depends on illumination-induced index change. See *Applied Phys. Lett.*, vol. 63, no. 13, pp. 1727–1729 (September 1993).

Scatter plates containing dispersed reflecting particles within a transparent sheet, may be used. Consistent with theory, use of particles of uniform size requires random positioning—in the thickness direction as well as in plane—for needed angle and phase content.

Phase masks may operate in transmission or reflection.

Recording Medium

The medium used in Example 2 is a member of a class described and claimed in co-pending U.S. application Ser. No. 08/698,143, filed Aug. 15, 1996. Briefly, it is an all-acrylate composition constituted of an oligomeric matrix and dispersed monomer, which together, under the influence of a photoinitiator, respond to illumination by local polymerization to increase refractive index. The specific composition was:

| Wt. % | Components |
|---|---|
| 37.23 | isobornyl acrylate |
| 55.84 | oligomeric urethane acrylate |
| 5.96 | photoinitiator |
| 0.97 | tertiary butyl hydroperoxide |

While there is no fundamental reason, z-direction shrinkage has somewhat impaired selectivity when using commodity-grade holographic film. (Shrinkage, always a consideration for high-packing density multiplexing, is controlled by the usual adherent substrate, leaving significant effect in the z-direction only.) Material selection, as well as change in orientation, will likely overcome this problem. Holographic film consists of dispersed silver halide particles in a supported gelatin layer. Processing includes development and fixing, followed by bleaching, to leave an image of varying refractive index. Alternatives include homogeneous dichromated gelatin films. See *Optical Holography*, Academic Press, Inc. San Diego, Calif., chap. 10, pp. 265–310 (1971).

There appears to be little reason for, and some disadvantage to, thick media. They are, however, not precluded, and may yield results comparable to those for shift holography multiplexing. Using a thick medium, phase selection may be used in the y-direction, while depending on Bragg selection in x. Lithium niobate and acrylate-based photopolymers have been used as thick media.

Recorded Array

The recorded medium will likely become an article of commerce. It may be disk-shaped, and resemble a CD-ROM. It may be of other planar shapes, e.g. rectangular. It may be non-planar. It will generally include a layer of recorded medium supported by a substrate. Particularly for thin layers, it may be supported on a flexible substrate and be spooled when not in use.

Regardless of physical form, stored information includes signal information, together with selection information, the latter in accordance with the inventive teaching. Selection information is in the form of refractive index variations defining a phase beam. It is possible to extract the selection information by irradiating the hologram with the corresponding signal beam. For usual practice, the phase beam, so defined, corresponds with the pattern of the phase mask responsible for producing the reference beam.

Apparatus

General design has been considered in the description of FIG. 1. It includes means for bringing about the required relative motion between the medium and the beam(s), together with means for generating the required phase beam. Requirements for recording and readout apparatus are the same. FIG. 1 includes apparatus for readout and is illustrative of readout apparatus (which is not provided with elements for introducing the signal). As in writing, the required relative motion may be by movement of the medium, by the phase mask, otherwise by the beam, or by any combination.

Experimental

Experimental apparatus was chosen to permit variation in parameters which will be fixed in practice. For example, a simple prism beam splitter was replaced by a relatively complex apparatus to allow changing relative brightness of the signal and reference beams. It consisted of a polarization beam splitter and a half-wave plate. The spatial light modulator, used experimentally, permitted variation in bit page density, as well as changing content

EXAMPLE 1

The apparatus was that shown in FIG. 1, using a spatial light modulator, displaying 640×480 pixels, as element 15. The phase mask, at plane 10, was a 2 cm×2 cm glass plate containing 1024×1024, 20 $\mu$m pixels. Phase-varying pixels were etch pits of ~$\pi$ phase depth for the recording wavelength of $\lambda$=532 nm. Both sides of the mask were antireflection coated. With lenses 12 and 24 in 4F configuration, i.e., with a single phase mask at plane 10 and using a DC filter at plane 25, a filtered image of the phase mask was produced in the medium. The beams illuminating the phase mask and the spatial light modulator were produced from one doubled $Nd^{3+}$:YAG source.

The reference beam was orthogonal to the medium. The signal beam was at 30° from orthogonal.

Figure 2:
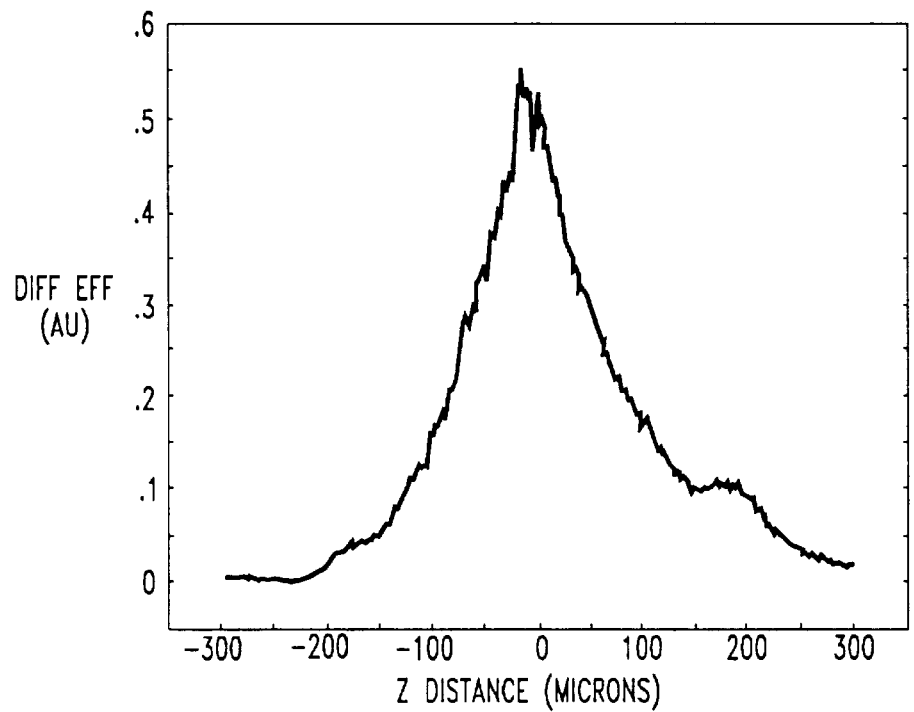
FIG. 2 is a plot of diffracted energy vs. distance in the z-direction for a single hologram.

The medium used was a 4 mm thick $LiNbO_3$ crystal. The diffraction intensity in arbitrary units is shown on FIG. 2. Selectivity measured as the peak width at half amplitude was about 130 $\mu$m.

EXAMPLE 2

Example 1 was repeated but for 3-level, z-direction multiplexing. The phase mask was shifted relative to the medium by a distance of 400 $\mu$m, to result in the data plotted on FIG. 3. Selectivity was substantially unchanged from that of the single recording of Example 1.

EXAMPLE 3

Figure 3:
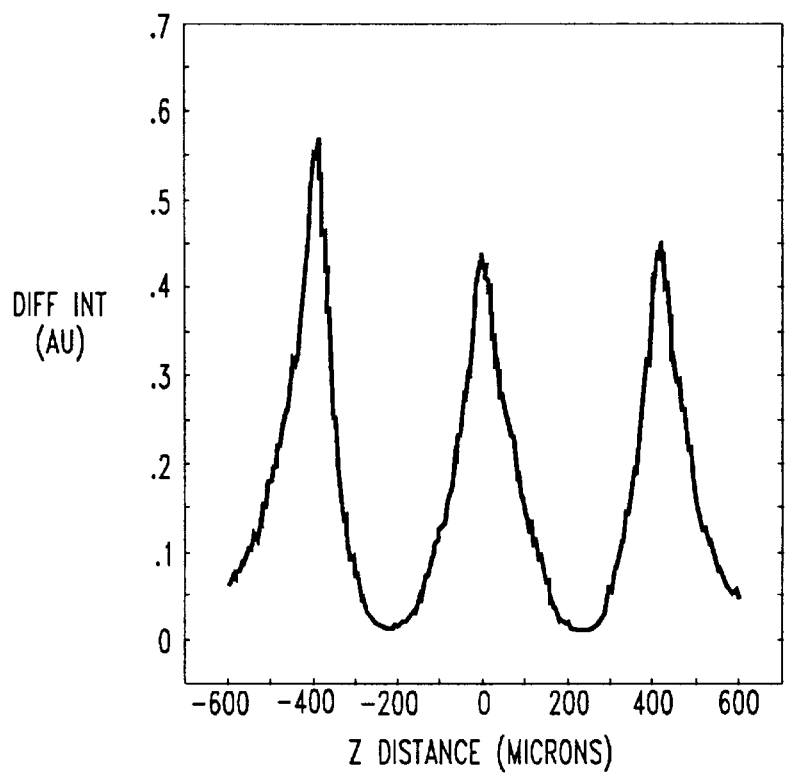
FIG. 3, on the same coordinates, is a plot for a multiplexed array of three z-direction holograms.

Example 2 was repeated, but substituting a 20 $\mu$m thick layer of an acrylate-based photo-initiated polymerization material, supported on a glass substrate. FIG. 3, while plotted for Example 2, is reasonably representative of results for this example as well.

EXAMPLE 4

Example 2 was repeated, but with reference and signal beams both incident at an angle of 35° from orthogonal. Selectivity was similar to that plotted on FIG. 2.

Notes Regarding Examples—Experiments were conducted with and without filtering at plane 25. Filtering, resulted in measurable improvement in SNR. Within the conditions of the Examples, there was no noticeable change in resolution for different z-shift positions. Depending on factors including the dynamic range of the material, the experimentally realizable 10-hologram multiplexing may serve to increase packing density by an order of magnitude as combined with the in-plane phase multiplexing of the companion application. Together with the there-reported >300 bits/$\mu m^2$, a total density >3000 bits/$\mu m^2$ is suggested.

Replication—Many contemplated uses require making copies of the holographic array "master". *Handbook of Optical Holography*, Academic Press 1979, at pp. 373–377, describes replication of non-multiplexed holograms. One method, "copying by reconstruction", first reconstructs the image and thereafter records a new hologram, using the reconstructed image. The method is applicable to thick as well as thin holograms. It has been used for multiplexed holograms by reconstructing and copying individual holograms one at a time.

Copying by reconstruction is usefully employed in the present work. The multiplexing step, independent of the individual hologram replication step, now follows the new procedure - medium and/or beams are stepped between sequential recordings. Alternatively, multiple holograms can be simultaneously reconstructed and copied by use of multiple, mutually-incoherent reference beams of differing angles of incidence, resulting in simultaneous replication of a series of overlapping holograms. This procedure is analogous to one using Bragg selection as described in *Optics Letters*, vol. 17, no. 9, pp. 676–678 (1992).

Phase-distance multiplexing offers a unique opportunity for replication. Since image selection does not depend on Bragg selectivity, there is no requirement for a thick medium. In thin media, the 2D array may be replicated in its entirety in a single step or series of steps without repeating the multiplexing procedure. Stamping, embossing, and casting, used for non-multiplexed 2D relief-phase holograms, becomes feasible. The array may be recorded as a topological master or may be converted to enable replication.

Where the holographic array is 2D, it may be replicated by any of the procedures used for copying photographs, but with an additional bleaching step. *Holography Handbook*, Ross Books, Berkeley, Calif., pp. 56,57, 1993. Bleaching converts an amplitude hologram into a phase hologram— e.g., the developed film image, constituted of elemental silver particles in a matrix, is rendered colorless leaving index variations as the only record of its presence. It is convenient to replicate from an unconverted—unbleached— master.

There is a further possibility offered in replication of 2D arrays. Since all relevant information—now including that necessary for selection as well as for reconstruction—is independent of thickness, replication does not critically depend on wavelength. The entire array or a portion may be reproduced using a wavelength which matches the actinic properties of the copy medium. Ordinarily, this leads to use of a wavelength shorter than that used during mastering and reconstruction.

Applications

The advance offers significant service opportunities. The holographic array, in the possession of a user, may be selectively accessed upon payment. An analogous prior art practice uses CD ROMs in which access to specified segments, each containing prescribed software or data, is granted by access codes which are given to the user at his request. See, *CD ROM Librarian*, vol 7, no. 4, pp. 16–21, April 1992. Under certain circumstances, access to the entire array may be granted as part of an initial sale, by use fee, or by subscription. Alternatively, the array may be centrally located and accessed by remote users.

In most uses, hologram/multiplex recording serves only for initial supply. Thereafter, they are used in "read only" applications. Other uses are served by "write once" —as in creation of a lasting database. Avoidance of thick media overcomes an obstacle to "read-write" usage.

Variations

Considerable variation in scheduling of multiplex direction is possible, particularly for the compound process using both z- and in-plane multiplexing. It will likely prove convenient to record an entire x-y array on a first plane, before changing distance. A number of circumstances, possibly for read-out efficiency—for more effective segmentation—may suggest initial position-by-position z-direction multiplexing before in-plane shifting. It may be useful to use some form of hybrid processing—e.g., by partial plane x-y processing followed by changing distance.

Variations described in the companion application are possible. Beam steering with a stationary medium may be desired. The methods are applicable to non-planar media— to cylinders and other geometric forms. They are useful with flexible media in mastering and/or replication, and, particularly with thin media, may be coiled for storage, perhaps as tape. In-plane multiplexing may follow a rectilinear format; continuous edge-to-edge rows may be followed by stepwise motion to initiate each subsequent row; rows may be offset so that holograms are staggered in the y-direction. Relative motion of the medium may be circular, with successive rows along successive circular paths of increasing radius from a common point of origin. Description remains unchanged— "x-direction", "shift-direction", etc., in this event, describe instantaneous directions.

Much of the experimental work was based on transmission holography using a Fourier transform for the signal. The multiplexing method of the invention is not specific to this particular form, so that recording may be based on reflection holography, may image the signal on the medium, or may record the hologram on a plane intermediate the Fourier and image planes of the signal. The various other adjuncts used in holography are not precluded—these include use of diffusers nominally in contact with the transparency or at an image plane to filter out all but a desired signal mode. These and other forms of holograms are suitably multiplexed.

The requirement that the phase mask used in reconstruction be identical to that used in recording, is an inherent safeguard, assuring user authenticity, and permitting encryption. The same purpose may be served by translation—e.g. rotation or shifting—of the mask relative to hologram position. In this manner, improper possession would be inadequate for accessing.

The invention claimed is:

1. Holographic process in which an array of overlapping holograms is recorded in a recording medium, holograms being produced by interference of a reference beam and a signal beam, in which the reference beam is a phase beam which consists essentially of a multitude of rays of varying angle of incidence and of non-uniform phase, in which the phase beam is produced by illumination of a phase mask, and in which the process comprises changing the position of the phase mask for recording different holograms,

CHARACTERIZED IN THAT the phase mask position is changed by changing its distance from the medium, in order to enable selection of individual holograms upon reconstruction.

2. Process of claim 1 in which the phase mask is a binary phase mask.

3. Process of claim 1 in which the pattern of the ray angles of the reference beam does not repeat over the field of the hologram.

4. Process of claim 1 including moving the medium and the beams relative to each other, moving including a component in the plane of the recording medium, for recording different holograms.

5. Process of claim 1 in which the thickness of the recording medium is less than 1 mm.

6. Process of claim 1 in which the content of the reference beam is deterministic.

7. Process of claim 1 in which the reference beam is spatially filtered.

8. Process of claim 1 including unspooling the recording medium prior to recording.

9. Process of claim 1 including signal reconstruction.

10. Holographic process comprising reconstruction of individual holograms contained in an array of overlapping individual holograms recorded in a medium, the process comprising illumination with a reference beam, in which the reference beam is a phase beam which consists essentially of a multitude of rays of varying angle of incidence and of non-uniform phase, in which the phase beam is produced by illumination of a phase mask, and in which the process comprises changing the position of the phase mask for reconstructing different holograms,

CHARACTERIZED IN THAT the array comprises a series of overlapping holograms, and in that the phase mask position is changed by changing its distance from the medium to enable selection of individual holograms within the series.

11. Process of claim 10 in which the series comprises completely overlapping holograms and in which the array includes a plurality of series.

12. Process of claim 11 in which hologram series are arrayed within the medium to form x-direction rows arrayed in the y-direction, with hologram series overlapping in both directions.

13. Process of claim 11 in which the array is circular and comprises multiple concentric circular rows with hologram series overlapping both within rows and from row-to-row.

14. Process of claim 11 in which the array comprises individual segments, each including at least one series.

15. Process of claim 14 in which access to a selected segment is in accordance with access instructions for the selected segment.

16. Process of claim 15 in which the medium is in the possession of a user and is owned by a service provider.

17. Process of claim 16 in which phase mask information required for access is restricted to qualified users.

18. Process of claim 17 in which required information comprises positioning of a phase mask.

19. Process of claim 10 including recording of at least a part of the array, in which recording includes interfering a reference beam and a signal beam in the recording medium.

20. Process for replication of a holographic array of overlapping holograms

CHARACTERIZED IN THAT the array includes a multiplicity of series, each series including a multiplicity of totally overlapping individual holograms, in which individual holograms are selected in dependence on content of a reference beam which consists essentially of a multitude of rays of varying angle of incidence and of non-uniform phase, in which the array is recorded in a medium of a thickness of less than 1 mm, and in that the array is replicated by a procedure selected from the group consisting of stamping, embossing, and procedures used in photography.

21. Process of claim 20 in which information replicated is in the form of surface topological variations, and in that the array is replicated by a procedure selected from the group consisting of stamping and embossing.

* * * * *